(12) United States Patent
Rothman et al.

(10) Patent No.: US 7,475,233 B2
(45) Date of Patent: Jan. 6, 2009

(54) METHOD AND APPARATUS FOR DISPLAYING A LANGUAGE SPECIFIC TEXT STRING IN A PRE-BOOT ENVIRONMENT

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 10/441,490

(22) Filed: May 20, 2003

(65) Prior Publication Data

US 2004/0236567 A1 Nov. 25, 2004

(51) Int. Cl.
G06F 9/00 (2006.01)
G06F 9/24 (2006.01)
(52) U.S. Cl. .................. 713/1; 713/2; 713/100
(58) Field of Classification Search ........ 713/1
See application file for complete search history.

(56) References Cited

U.S. PATENT DOCUMENTS

| 6,366,297 | B1* | 4/2002 | Feagans ............... 715/736 |
| 6,754,668 | B2* | 6/2004 | Noble et al. ........... 707/102 |
| 6,775,768 | B1* | 8/2004 | Raspe ................. 713/2 |
| 2002/0111933 | A1* | 8/2002 | Noble et al. ............ 707/1 |
| 2003/0004707 | A1* | 1/2003 | Ferin ................. 704/10 |
| 2003/0097554 | A1* | 5/2003 | Cheston et al. ......... 713/2 |
| 2003/0133041 | A1* | 7/2003 | Curtis et al. ........... 348/462 |
| 2003/0182632 | A1* | 9/2003 | Murdock et al. ........ 715/536 |
| 2006/0074627 | A1* | 4/2006 | Moore et al. ........... 704/8 |
| 2006/0242202 | A1* | 10/2006 | Li .................... 707/104.1 |

OTHER PUBLICATIONS

Office action in the corresponding Chinese Patent Application No. 03156077.6 dated Aug. 11, 2006, 5 pages.
Extensible Firmware Interface Specification, Intel Corporation, Version 1.10, Dec. 1, 2002, 1084 pages.
Extensible Firmware Interface Specification, Version 1.10, Specification Update, Intel Corporation, Version -001, Nov. 26, 2003, 63 pages.

* cited by examiner

*Primary Examiner*—Thuan N Du
*Assistant Examiner*—Michael J Brown
(74) *Attorney, Agent, or Firm*—Hanley, Flight & Zimmerman, LLC (57) ABSTRACT

Methods and apparatus for displaying a language specific text string in a pre-boot environment are disclosed. A disclosed system loads certain device drivers in a pre-boot environment (i.e., before an operating system is loaded) based on a boot block in a flash memory device. The user is then presented with a text-based interface in the pre-boot environment. The system allows the user to select a language for the text-based user interface. Text strings used to display the text-based user interface in the selected language may be stored in the same flash memory device used to store the boot block. In addition, other resources may hold additional text strings in other languages. For example, a hard disk drive and/or a network device may store additional text strings in other languages for use in the pre-boot text-based user interface.

25 Claims, 5 Drawing Sheets

METHOD AND APPARATUS FOR DISPLAYING A LANGUAGE SPECIFIC TEXT STRING IN A PRE-BOOT ENVIRONMENT

TECHNICAL FIELD

The present disclosure pertains to displaying a text string on a computer display and, more particularly, to methods and an apparatus for displaying a language specific text string in a pre-boot environment.

BACKGROUND

Prior to loading a full operating system with a graphical user interface (e.g., Microsoft Windows®), most computers are capable of presenting a text-based user interface in a pre-boot environment. For example, most DOS (Disk Operating System) based systems enter a text-based environment if the F2 key is pressed during start up. Typically, instructions and data used to generate this text-based interface are stored in a flash memory device. For example, text strings displayed as part of the text-based interface are typically stored in the flash memory device.

In order to accommodate different geographical regions, the flash memory device may store the text strings in more than one language. However, flash memory space is limited by size and cost. As a result, very few languages are typically supported within the same computer.

Instead, most manufacturers produce different Stock Keeping Units (SKUs) for different geographical regions, wherein each SKU may have a flash memory device with different languages supported. However, this approach is cumbersome. Requiring different SKUs for different regions complicates the overall manufacturing and distribution process.

DETAILED DESCRIPTION

Figure 1:
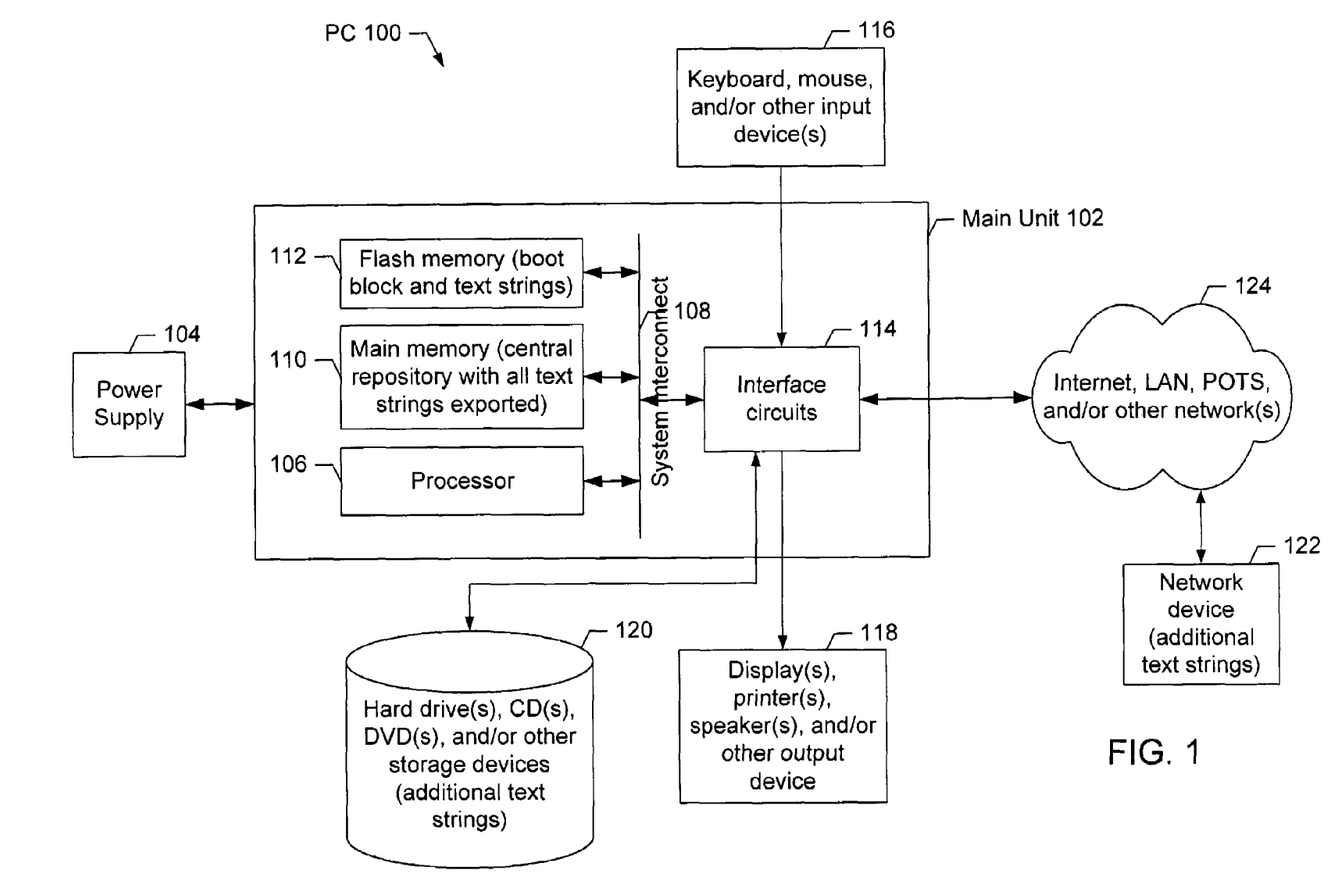
FIG. 1 is a block diagram of an example computer system illustrating an environment of use for the disclosed system.

Generally, the disclosed system loads certain device drivers in a pre-boot environment (i.e., before an operating system is loaded) based on a boot block in a flash memory device. The user is then presented with a text-based interface in the pre-boot environment. The system allows the user to select a language for the text-based user face. Text strings used to display the text-based user interface in the selected language may be stored in the same flash memory device used to store the boot block. In an example, text strings in the flash memory device 112 are exported to a central repository in main memory 110 (e.g., RAM). In addition, the flash memory device stores instructions used to discover additional text strings in other languages on other resources. For example, a hard disk drive and/or a network device may store additional text strings in other languages for use in the pre-boot text-based user interface. Once discovered, these additional text strings are also exported to the central repository in RAM A block diagram of an example computer system 100 is illustrated in FIG. 1. The computer system 100 may be a personal computer (PC) or any other computing device. In the example illustrated, the computer system 100 includes a main processing unit 102 powered by a power supply 104. The main processing unit 102 may include a processor 106 electrically coupled by a system interconnect 108 to a main memory device 110, a flash memory device 112, and one or more interface circuits 114. In an example, the system interconnect 108 is an address/data bus. Of course, a person of ordinary skill in the art will readily appreciate that interconnects other than busses may be used to connect the processor 106 to the other devices 110-114. For example, one or more dedicated lines and/or a crossbar may be used to connect the processor 106 to the other devices 110-114.

The processor 106 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 106 may include any type of well known cache memory, such as static random access memory (SRAM). The main memory device 110 may include dynamic random access memory (DRAM) and/or any other form of random access memory. For example, the main memory device 110 may include double data rate random access memory (DDRAM). The main memory device 110 may also include non-volatile memory. In an example, the main memory device 110 stores a software program which is executed by the processor 106 in a well known manner.

The flash memory device 112 may be any type of flash memory device. As described below, the flash memory device 112 may store firmware used to boot the computer system 100. In addition, the flash memory device 112 may store text strings in one or more languages. The firmware and/or other instruction in the flash memory device 112 are used to discover additional text strings in other languages stored on other resources (e.g., a hard disk 120 and/or a network device 122).

The interface circuit(s) 114 may be implemented using any type of well known interface standard, such as an Ethernet interface and/or a Universal Serial Bus (USB) interface. One or more input devices 116 may be connected to the interface circuits 114 for entering data and commands into the main processing unit 102. For example, an input device 116 may be a keyboard, mouse, touch screen, track pad, track ball, isopoint, and/or a voice recognition system.

One or more displays, printers, speakers, and/or other output devices 118 may also be connected to the main processing unit 102 via one or more of the interface circuits 114. The display 118 may be a cathode ray tube (CRT), a liquid crystal displays (LCD), or any other type of display. The display 118 may generate visual indications of data generated during operation of the main processing unit 102. The visual indications may include prompts for human operator input, calculated values, detected data, etc. As described in detail below, these displays may be generated by firmware in a pre-boot environment. In addition, text strings used on these pre-boot displays may be in a user selected language.

The computer system 100 may also include one or more storage devices 120. For example, the computer system 100 may include one or more hard drives, a compact disk (CD) drive, a digital versatile disk drive (DVD), and/or other computer media input/output (I/O) devices. In addition to the text strings stored in the flash memory device 112 (if any), one or more storage devices 120 (e.g., a hard disk) may store text strings in one or more languages.

The computer system 100 may also exchange data with other devices 122 via a connection to a network 124. The network connection may be any type of network connection, such as an Ethernet connection, digital subscriber line (DSL), telephone line, coaxial cable, etc. The network 124 may be any type of network, such as the Internet, a telephone network, a cable network, and/or a wireless network. The network devices 122 may be any type of network devices 122. For example, the network device 122 may be a client, a server, a hard drive, etc. These network devices 122 may store additional text strings for additional language support.

Figure 2:
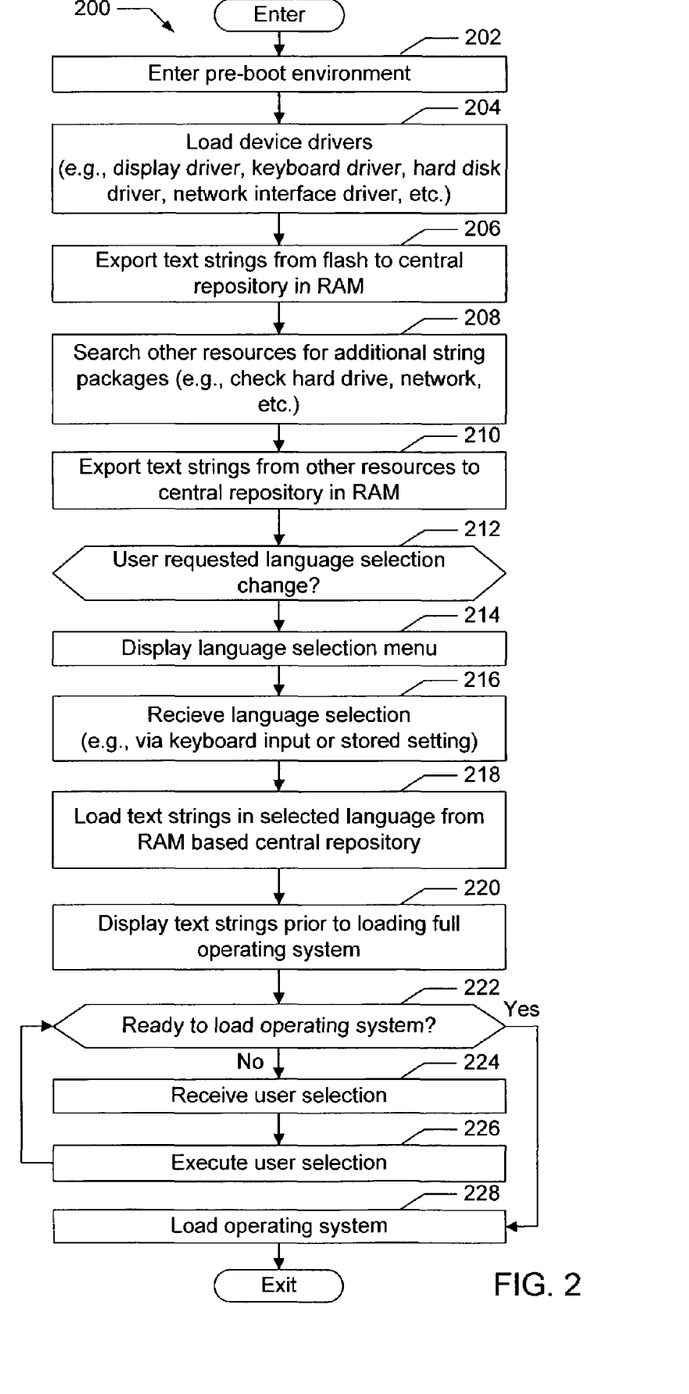
FIG. 2 is a flowchart representative of example machine readable instruction which may be executed by a device to implement an example method of displaying a language specific text string in a pre-boot environment.

An example process 200 for displaying a language specific text string in a pre-boot environment is illustrated in FIG. 2. Preferably, the process 200 is embodied in one or more software programs which are stored in one or more memories (e.g., flash memory 112 and/or hard disk 120) and executed by one or more processors (e.g., processor 106) in a well known manner. However, some or all of the blocks of the process 200 may be performed manually and/or by some other device. Although the process 200 is described with reference to the flowchart illustrated in FIG. 2, a person of ordinary skill in the art will readily appreciate that many other methods of performing the process 200 may be used. For example, the order of many of the blocks may be altered, the operation of one or more blocks may be changed, blocks may be combined, and/or blocks may be eliminated.

In general, the example process 200 loads certain device drivers in a pre-boot environment (i.e., before an operating system is loaded) based on a boot block in a flash memory device 112. The user is then presented with a text-based interface in the pre-boot environment. The system allows the user to select a language for the text-based user interface. Text strings used to display the text-based user interface in the selected language may be stored in the same flash memory device 112 used to store the boot block. In addition, the flash memory device 112 may store text strings in one or more languages. The firmware and/or other instruction in the flash memory device 112 are used to discover additional text strings in other languages stored on other resources (e.g., a hard disk 120 and/or a network device 122).

The example process 200 begins by entering a pre-boot environment (block 202). A pre-boot environment is an environment in which an intended operating system (OS), such as Microsoft Windows® is not yet running. In the pre-boot environment, drivers may be loaded that enable a user to obtain and change settings for particular devices. The pre-boot environment has limited resources and, therefore, interfaces provided by drivers for the motherboard and the peripherals may be less user friendly and are usually unfamiliar to most users in contrast to the runtime environment provided after an OS is operating (e.g., a Windows® environment).

Entering the pre-boot environment may be initiated by, for example, applying power to the computer system 100. As is known to those having ordinary skill in the art, upon receiving power, the processor 106 experiences a reset condition that causes the processor 106 to execute instructions located in a boot block 302 of the flash memory 112 via a reset vector in the processor 106 (see FIG. 3). The instructions in the boot block 302 impart functionality to the processor 106 and inform the processor 106 of the location of further firmware instructions to be executed by the processor 106. The firmware instructions executed by the processor 106 may be stored in the flash memory 112, the hard drive 120, and/or any other memory device.

Next, the example process 200 attempts to load one or more device drivers in the pre-boot environment (block 204). For example, most PCs 100 are capable of loading a text based display driver, a basic keyboard driver, a hard disk driver, and a network interface driver prior to loading a full operating system such as a version of Microsoft Windows®. Enabling input and output devices prior to booting a full operating system allows an operator to diagnose problems, manipulate settings, and perform other operations without the operating system being fully loaded.

Figure 3:
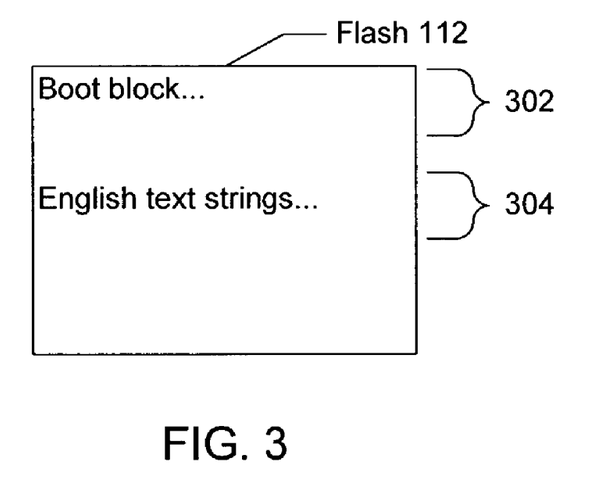
FIG. 3 is a block diagram of an example flash memory device storing a boot lock and a text string.

Typically, text strings used in the pre-boot environment are loaded from the flash memory device 112 and exported to a central repository in main memory 110 (block 206). For example, English language text strings 304 and/or any other language text strings may be stored in the flash memory 112. The central repository stores the text strings for each language by string number. For example, string number 1 may be "Hello World" in a plurality of different languages.

Figure 4:
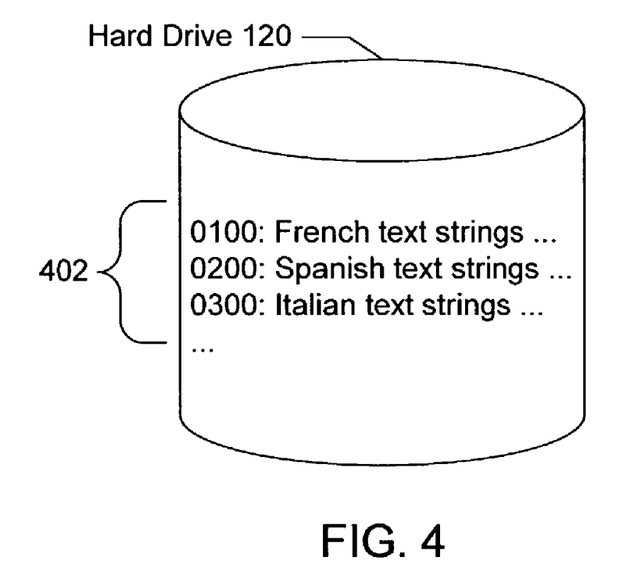
FIG. 4 is a block diagram of a storage device storing additional text strings.

Once these device drivers and/or other device drivers are loaded, the example process 200 may search resources other than the flash memory 112 for additional string packages (block 208). For example, additional text strings 402 may be stored on the hard drive or some other storage device 120 (see FIG. 4). In an example, the process 200 searches one or more predefined areas of a storage device for the additional text strings (e.g., a system partition on a hard disk 120). Similarly, additional text strings 402 may be retrieved from one or more network devices 122 via the network 124. Like the text strings loaded from the flash device 112, text strings loaded from other resources are exported to the central repository in main memory 110 (block 210).

Figure 5:
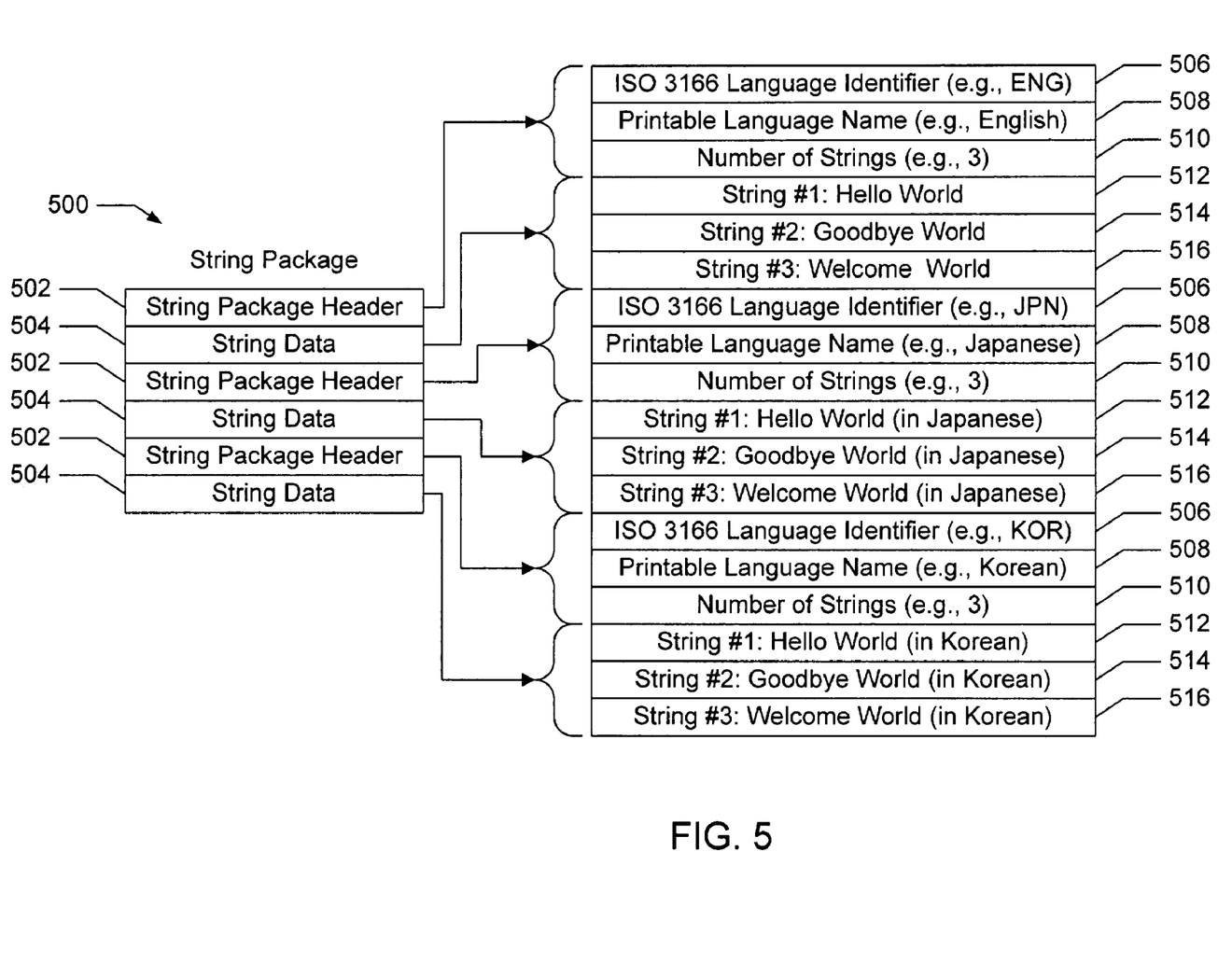
FIG. 5 is a block diagram of an example string package.

In an example, the additional text strings 402 are stored as a string package 500. An example of a string package 500 is illustrated in FIG. 5. In this example, the string package 500 includes three string package headers 502 and three sets of string data 504. In this example, each string header 502 includes a language identifier 506, a printable language name 508, and a number of strings 510. Each language identifier 506 may be any type of language identifier. For example, language identifiers from the ISO 3166 standard (International Organization for Standardization list of country names and codes) may be used. Each printable language name 508 may be used to display the language selection in a language selection menu as described below. For example, the printable language name 508 for English may be "English" while the printable language name 508 for French may be "Francais." Each number of strings 510 may be any number of strings stored for that language. For example, three different strings 512, 514, 516 are shown for each language in the example of FIG. 5. Specifically, in this example, a first string 512 says "Hello World" in each of English, Japanese, and Korean; a second string says "Goodbye World" in each of English, Japanese, and Korean; and a third string says "Welcome World" in each of English, Japanese, and Korean.

The process 200 may determine if the user has requested a language selection change (block 212). For example, the user may enter a command requesting a language selection change. Alternatively, the process 200 may always prompt the user for a language selection change each time the computer system 100 is booted.

Figure 6:
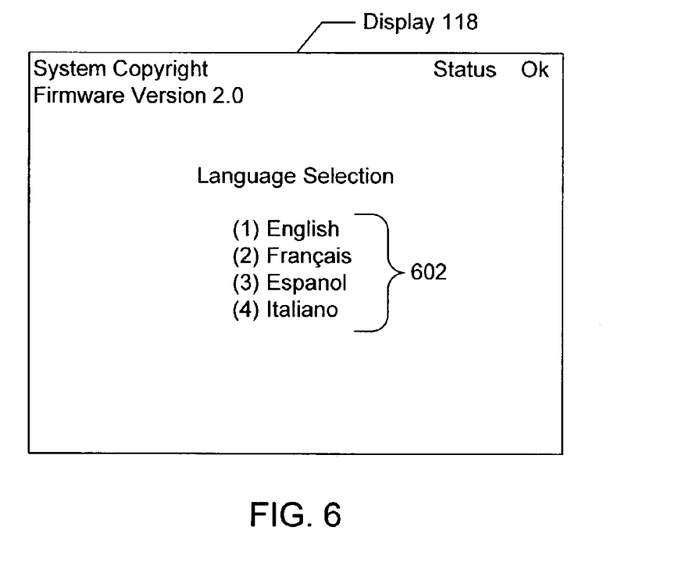
FIG. 6 is a screen diagram of an example language selection menu.

If the user requests a language selection change, or the process 200 is programmed to prompt the user for a language selection change, the process 200 displays a language selection menu 602 (block 214). An example of a language selection menu 602 is illustrated in FIG. 6. Some of the choices in the language selection menu 602 may be stored in the flash memory 112. Other choices in the language selection menu 602 may be stored on the hard drive 120 or on a network device 122.

Next, the example process 200 receives a language selection (block 216). If a language selection menu is displayed, the user may select one of the languages in the language selection menu. For example, the user may use any menu selection technique, such as pressing a number key, to select a language. In this example, the keyboard driver being loaded allows the selected language to be received by the example process 200.

Alternatively, the example process 200 may read a stored setting to determine the language selection. The language selection setting may be stored anywhere, such as in the flash memory 112 or on the hard disk 120. For example, if a manufacturer knows a particular computer system 100 will be sold to an English speaking person, the manufacturer may preprogram the language selection to be English. Similarly, if a particular language selection was previously made via a language selection menu 602, the computer system 100 may store the setting for later retrieval.

Once a language selection is determined, the example process 200 loads the appropriate text string(s) from the central repository based on the current language selection (block 218). For example, the text strings may be stored on the hard disk 120 or retrieved from a network device 122. The text strings may be any type of text strings. For example, the text strings may be help prompts to guide a user.

Figure 7:
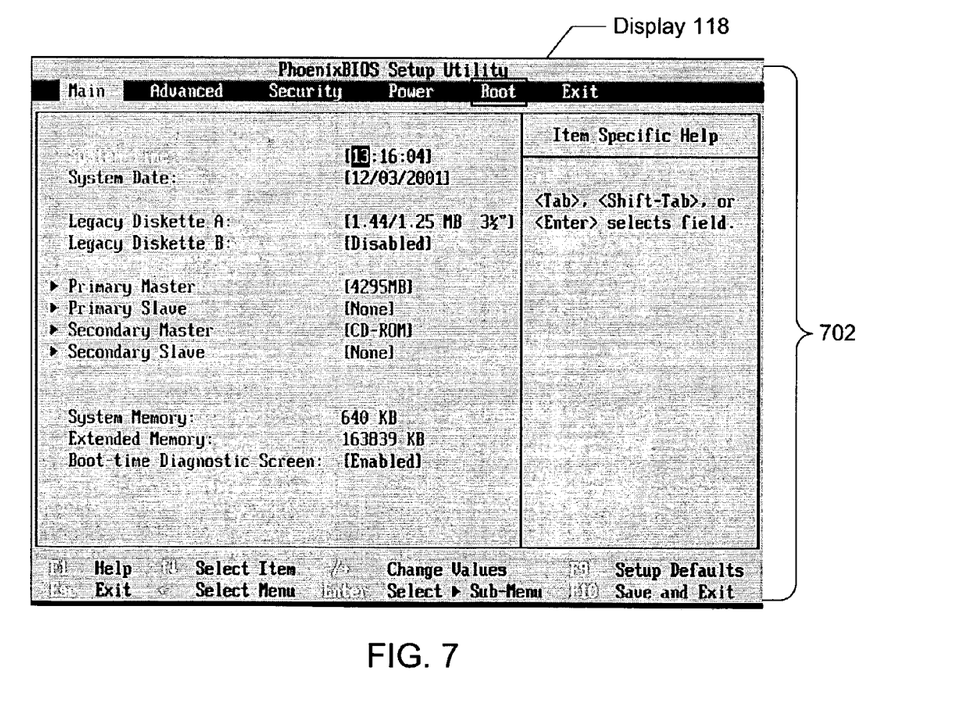
FIG. 7 is a screen diagram of an example of pre-boot user interface.

The loaded text strings are then displayed on the display 118 to the user (block 220). In this manner, the user may be guided in a selected language through certain setup options prior to loading an operating system. For example, the user may be given a list of setup options in the selected language. An example of a pre-boot text-based user interface 702 is illustrated in FIG. 7.

As the user navigates the pre-boot environment, the process 200 determines if the operating system should be loaded (block 222). If the user remains in the pre-boot environment, the process 200 may receive one or more user selections displayed in the selected language (block 224). In response to these user selections, the process 200 may execute certain predefined procedures (block 226). When the pre-boot environment is exited, the operating system may be loaded (block 228).

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of displaying text in a pre-boot environment, the method comprising:
   receiving selection data indicative of a language;
   loading a device driver based on instructions in a non-volatile memory device;
   exporting a text string from a device other than the non-volatile memory device to a central repository;
   loading the text string from the central repository, the text string being indicative of at least one word in the language; and
   displaying the at least one word prior to loading an operating system.

2. A method as defined in claim 1, wherein receiving the selection data comprises receiving a menu selection from a user.

3. A method as defined in claim 2, further comprising displaying a language selection menu.

4. A method as defined in claim 1, wherein receiving the selection data comprises reading a factory programmed option.

5. A method as defined in claim 1, wherein loading a device driver comprises loading a hard disk driver.

6. A method as defined in claim 1, wherein loading a device driver comprises loading a network interface driver.

7. A method as defined in claim 1, wherein executing the device driver comprises executing the device driver to access help text in a user selected language.

8. A method as defined in claim 1, wherein displaying the at least one word comprises displaying a pre-boot setup screen.

9. An apparatus comprising:
   a processor;
   a hard disk drive operatively coupled to the processor, the hard disk drive storing a first text string in a first language and a second text string in a second language; and
   a flash memory operatively coupled to the processor, the flash memory storing instructions to load a device driver for the hard disk drive and instructions used to retrieve the first text string from the hard disk.

10. An apparatus as defined in claim 9, wherein the flash memory operatively stores a boot block.

11. An apparatus as defined in claim 9, wherein the flash memory stores a third text string in a third language.

12. An apparatus as defined in claim 11, wherein the first text string communicates a message in the first language, the second text string communicates the message in the second language, and the third text string communicates the message in the third language.

13. An apparatus as defined in claim 12, further comprising a display operatively coupled to the processor, wherein the processor executes a program causing:
   the display to display a language selection menu;
   the processor to receive a language selection; and
   the display to display one of the first text string, the second text string, and the third text string based on the language selection.

14. An apparatus as defined in claim 13, wherein the software program causes the display to display one of the first text string, the second text string, and the third text string prior to loading an operating system.

15. An apparatus comprising:
   a network interface circuit;
   a flash memory storing a firmware program, a pointer to a device driver for the network interface circuit, and instructions indicative of a network address
   a display; and
   a processor operatively coupled to the network interface circuit, the flash memory, and the display, the processor being structured to execute the firmware program to load the device driver and retrieve a plurality of text strings in a plurality of user selectable languages from the network address.

16. An apparatus as defined in claim 15, wherein the firmware program causes:
the display to display a language selection menu;
the processor to receive a language selection; and
the display to display a text string in a language determined by the language selection.

17. An apparatus as defined in claim 16, wherein the firmware program causes the display to display the text string prior to loading an operating system.

18. A machine readable media storing instructions to cause a machine to:
receive selection data indicative of a language;
load a device driver based on instructions in a non-volatile memory device;
execute the device driver to access text data from a location other than the non-volatile memory device, the text data being indicative of at least one word in the language; and
display the at least one word prior to loading an operating system.

19. A machine readable media as defined in claim 18, wherein the instructions are structured to cause the machine to display a language selection menu and receive a menu selection from a user indicative of the language 20. A machine readable media as defined in claim 18, wherein the instructions are structured to cause the machine to read factory programmed selection data indicative of the language.

21. A machine readable media as defined in claim 18, wherein the instructions are structured to cause the machine to access the text data from a hard disk drive.

22. A machine readable media as defined in claim 18, wherein the instructions are structured to cause the machine to access the text data from a network interface circuit.

23. An apparatus comprising:
a hard disk drive;
a flash memory storing a firmware program, a pointer to a device driver for the hard disk drive, and a network address;
a cathode ray tube (CRT) display; and
a processor operatively coupled to the hard disk drive, the flash memory, and the cathode ray tube (CRT) display, the processor being structured to execute the firmware program to load the device driver and retrieve a plurality of text strings in a plurality of user selectable languages from the hard disk drive.

24. An apparatus as defined in claim 23, wherein the firmware program causes the cathode ray tube (CRT) to display the text string prior to loading an operating system.

25. An apparatus as defined in claim 24, wherein the firmware program causes:
the cathode ray tube (CRT) to display a language selection menu;
the processor to receive a language selection; and
the cathode ray tube (CRT) to display a text string in a language determined by the language selection.

* * * * *

UNITED STATES PATENT AND TRADEMARK OFFICE
CERTIFICATE OF CORRECTION

| | |
|---|---|
| PATENT NO. | : 7,475,233 B2 |
| APPLICATION NO. | : 10/441490 |
| DATED | : January 6, 2009 |
| INVENTOR(S) | : Rothman et al. |

It is certified that error appears in the above-identified patent and that said Letters Patent is hereby corrected as shown below:

Col. 6, line 60: Replace "address" with -- address; --.

Signed and Sealed this

Tenth Day of March, 2009

JOHN DOLL
*Acting Director of the United States Patent and Trademark Office*